Feb. 3, 1970  L. TRIPLETT  3,492,909
SECUREMENT CONSTRUCTION
Filed July 26, 1968

INVENTOR.
LEE TRIPLETT
BY
HIS ATTORNEY

United States Patent Office 3,492,909
Patented Feb. 3, 1970

3,492,909
SECUREMENT CONSTRUCTION
Lee Triplett, 2878 South 8600 West,
Magna, Utah 84044
Filed July 26, 1968, Ser. No. 748,057
Int. Cl. F16b 33/04
U.S. Cl. 85—70                    2 Claims

ABSTRACT OF THE DISCLOSURE

The present invention comprises a securement construction in which a compression loaded device is inserted through an aperture in certain base structure to which an external or attachment member is to be affixed, whether temporarily or permanently. The device includes an elastomeric sleeve which is reinforced by a tubular web embedded in the elastomeric material of the sleeve. The device thus includes the novel concept of compression loading a web-reinforced sleeve so as to avoid creeping of elastomeric material over the nut of the device, and which would result in loss compression loading and permanent distortion of the character of the affected end of the sleeve of the device. In preferred embodiments of the invention, a compression nut or nut means is employed so as to permit flow of elastomeric material of the sleeve into a concavity area of the nut means, thus insuring that the web itself is compressed solely in the direction parallel to the axis of loading and, hence, will not fracture. In a further embodiment of the invention, the sleeve itself has its rearward-end chamfered to permit a pulling or "sucking in" of this end within the nut concavity so as to eliminate substantially all possible chance of permanent distortion, set or fracture of the sleeve of the device, thereby permitting repeated use and re-use of the device for attaching external members to selected base structure.

---

The present invention relates to securement constructions and, more particularly, to a new and improved securement construction incorporating a novelly-constructed, resilient-sleeve, compression-loading device. Webbing, in particular, is introduced into the elastomeric sleeve employed in the invention so as to preclude loss of compression-loading as a result of elastomeric material otherwise creeping over the nut or nut means used in the invention, and consequently distorting the sleeve itself.

In the past, there have been a number of different types of devices used for attaching one member to another. Many of these are useful only if access is supplied to both sides of the base structure to which the external member is to be attached. Certain devices have been devised for blind holes, wall-board wall constructions, and so forth. A number of these have proven to be very expensive to manufacture and difficult to re-use.

Accordingly, a principal object of the present invention is to provide a new and improved, compression loadable securement device, and corresponding constructions, containing a web-reinforced elastomeric sleeve.

An additional object is to provide a compression-type securement device in which chances of creep of the sleeve over its rearward reaction member or nut is substantially avoided.

An additional object is to provide a securement device employing an elastomeric sleeve, wherein the sleeve is suitably reinforced such that compression loading thereof will not chance the fracturing or distortion of the sleeve at its rearward-end upon compression loading of the sleeve.

An additional object is to provide a securement device employing an elastomeric sleeve wherein the end of the reinforced sleeve is chamfered, this to permit a compression flow of the rear portion of the sleeve into a relieved area of the nut means used, so as to insure unidirectional compressing of the web within the sleeve and avoidance of fractioning the fibers thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

in FIGURE 1 the securement device of the invention is shown to be slightly, manually pre-loaded.

Figure 1:
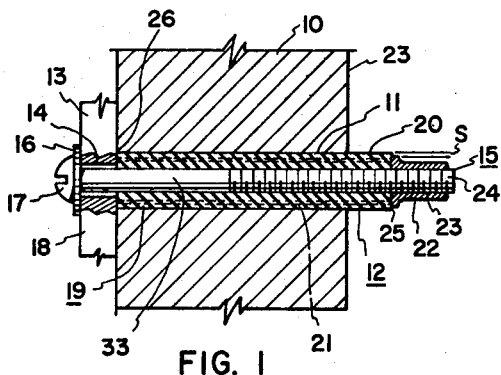
FIGURE 1 is a fragmentary vertical section of a base structure, i.e. a wall, wall panel, or other member to which an external or attachment member is to be attached by means of the compression device of the invention.
Figure 1A:
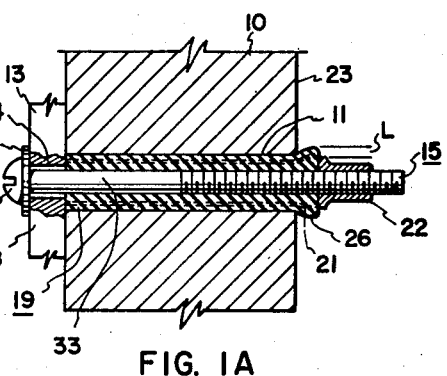
FIGURE 1A is a view similar to FIGURE 1 and illustrates the structure when substantial compression loading has been applied as by rotating the bolt of the securement device.
Figure 2:
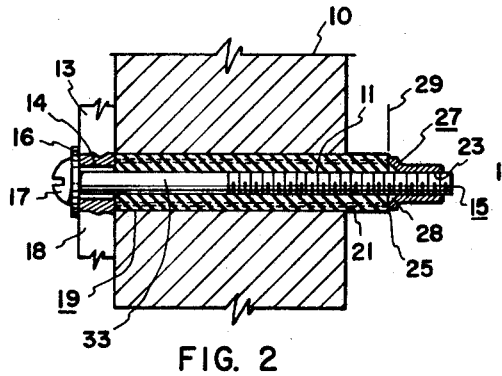
Figure 2A:
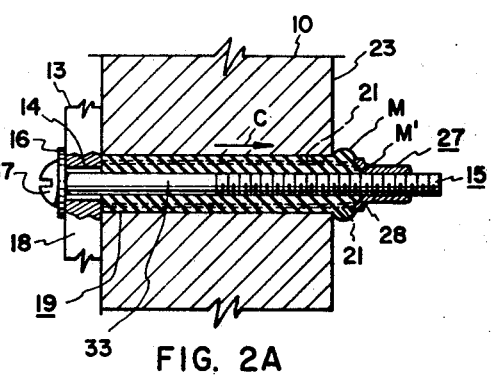

FIGURES 2 and 2A illustrate structures similar to and in correspondence with that shown in FIGURES 1 and 1A, but with an additional structural feature, namely, nut means provided with an interior relief area so as to supply access to flow of elastomeric material principally within the boundary of the web, thereby providing a unidirectional compression of the web so as to avoid chancing the fracturing of its fibers.

Figure 3:
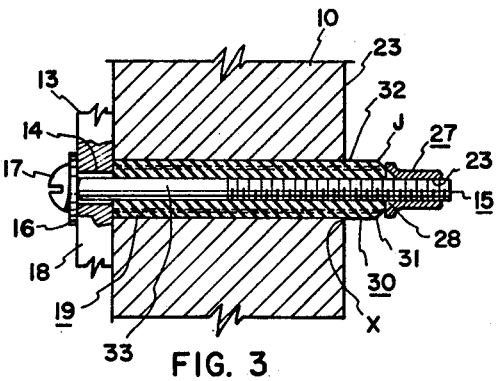
Figure 3A:
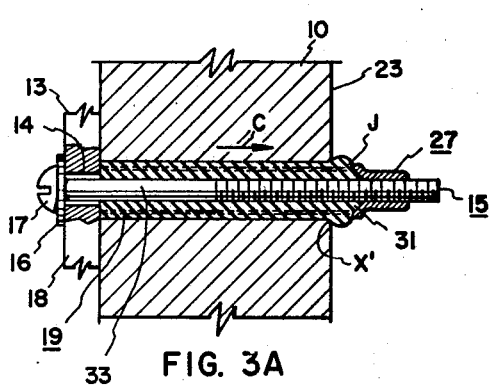

FIGURES 3 and 3A illustrate in pre-load and compression-load conditions, respectively, a further embodiment of the invention wherein, in addition to the nut means concavity supplied, the rearmost end of the elastomeric sleeve is rounded or otherwise tapered such that the same will easily advance into the concavity of the nut means as a compression force is applied.

Figure 3B:
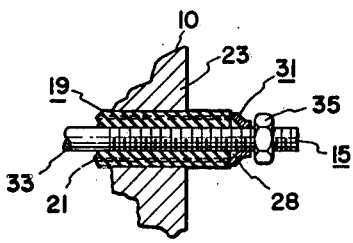

FIGURE 3B illustrates alternate nut means which may be used in practicing the invention.

In FIGURE 1, base structure 10 is shown to be provided with an aperture 11 which will generally take the form of a drilled hole or bore. Securement device 12 is used in this instance to affix attachment member 13 to base structure 10. Attachment member 13 may take any one of a number of forms such as coat hangers, clips, hinges, in fact, almost any conceivable number of devices which are useful to attach to a base structure 10 such as a wall, wall panel, post, or other objects. Attachment member 13 itself will generally include an aperture 14 to accommodate passage therethrough of shank 33 of bolt 15. Of course, the invention also includes the structural situation wherein bolt 15 is integrally formed with attachment member 13. In the majority of cases, however, bolt 15 will comprise a separate part and be provided with washer 16 serving as a bearing member between the head 17 of bolt 15 and the outer surface of attachment member 13.

Disposed over bolt 15 is a uniformly cylindrical, reinforced, resilient elastomeric sleeve 19. The outside diameter of sleeve 19 may be nominally that of the diameter of aperture 11, or may be slightly less, if desired. Elastomeric sleeve member 19 includes an elastomeric body 20 and also a tubular web 21 embedded in body 20. As to choice of materials, extensive experimentation has indicated that the best results are obtained where medially embedded cylindrical web 21 is composed of a woven nylon cord or thread, and where elastomeric body 20 is made of the elastomeric substance going under the trade name Neoprene.

Nut 22 is internally threaded at 23 to accommodate the threads 24 on bolt 15. Nut 22 can have a transverse cross-section of circular configuration and can be tapered as indicated. Of importance is the fact that the outside diameter of that portion of the nut 22 which bears against the adjacent end of sleeve 19 should be not greater than the diameter of the diameter of the same. Such permits a close fit, i.e. of the order of five-thousandths of an inch, between the elastomeric sleeve and aperture 11, and yet allows the device 12, when assembled and when including attachment member 13, simply to be thrust through aperture 11 as a unit. In this manner there need be no access supplied relative to surface 23 of base structure 10. Rather, in assembly the structure as shown in FIGURE 1 is pre-assembled; that is, the device 12, with attachment member 13, is advanced toward base structure 10 such that elastomeric sleeve 19 is advanced through and extends beyond base structure 10. It will be noted that, preliminary to the insertion of the device through aperture 11, a slight manual pre-load will be applied to the device by the user simply rotating by his thumb and fingers nut 22 until the latter is securely against end 25 of sleeve 19.

In operation, the user will use a turning-device, such as a screw-driver, wrench, and so on, to turn the head 17, of whatever form, of bolt 15. The metal-to-metal contact of metal washer 14 and bolthead 17 provides a low-friction bearing engagement therebetween, much lower than the high friction engagement between elastomeric sleeve 19 and nut 22. Thus, one is allowed to turn bolt 17 by screw-driver or other means without chancing the simultaneous rotation of nut 22, owing to its high friction engagement with the end 25 of reinforced elastomeric sleeve 19. The sleeve itself is prevented from rotating because of its tight fit in aperture 11, its retention between the two members 13 and 22, and indeed, the high frictional force present at juncture 26 between the forward end of sleeve 19 and attachment member 13.

Continuation of the rotation of bolt 15 at head 17 produces a slight outward bulging of the sleeve at area 26. The compression loading of the sleeve, not only within aperture 11 but at portion 26, provides a very secure connection, one in which it is substantially impossible to withdraw the device from aperture 11 in the absence of rotating a bolt 15 in the opposite direction so as to loosen the compression loading of device 12. In this regard, extensive experimentation has been made with un-reinforced rubber or other elastomeric tubing. The same has proven somewhat unsatisfactory in certain contexts since, in the nut requirement being such that the outside diameter of the nut is less than the outside diameter of the sleeve, the sleeve will tend to creep over the outer periphery of a nut upon compression loading, thus destroying the potentially high compression loading; additionally, chancing substantial injury to the sleeve through exceeding its elastic limit and also in preventing a complete restoration of the same to its original configuration when compression loading is relieved. Satisfactory re-use, providing that the device can be withdrawn in the first instance, can only be accomplished by a substitution of a new sleeve for the existing sleeve which has been damaged. A highly advantageous and novel approach, as described herein, is to employ an elastomeric sleeve which is reinforced by an embedded, woven, tubular web made of nylon, for example. In such event the creeping of the elastomeric material over the nut, see FIGURE 1A, is avoided, the web prevents the tube from fracturing at its rearmost end, and the web itself aids in insuring that the tube can be restored to its initial condition when the compression loading of the device 12 is relieved.

A further and substantial improvement in an alternate embodiment of the invention is illustrated in FIGURES 2 and 2A wherein nut 27 includes a recess 28 relative to the plane or surface 29 of engagement of nut 27 with the end of elastomeric sleeve 19. FIGURE 2 illustrates the assembly of the device when simply unloaded or slightly pre-loaded through common thumb and finger manipulation of nut 27 prior to insertion of the device through aperture 11. FIGURE 2A illustrates a compression loading of the device through rotation of bolt 15 in a manner described in connection with FIGURES 1 and 1A. It will be noted in FIGURE 2A that the material M, i.e. the elastomeric material of elastomeric body 20 beyond the web, expands outwardly, by virtue of its hydraulic or fluidic character relating to resilient elastomeric materials, this to provide the retention force desired. Important note is to be taken that the elastomeric material M' interior of the web flows into the recess, cavity, or concavity 28 of nut 27. Such accomplishes the extremely important, practical advantage of insuring unidirectional compression of web 21, thus avoiding any possible chance of fracturing the fibers of the web. Note the unidirectional manner or compression as illustrated at C in FIGURE 2A relative to web 21. It is submitted that the provision for flow of elastomeric material, particularly that material within the web, insures a substantially increased useful life of the sleeve regardless of the number of times which it is compressed and/or reused. Such flow provision in the nut insures not only positive retention at M and preserves the contiguous character of the sleeve relative to aperture 11, but also is to be understood as being much preferred over the situation where the bolt itself is relieved to provide for such flow. In the latter event, the diameter of the bolt would have to be reduced and there would exist a marked reduction in the strength of the bolt and the compression loading thereof which would be possible.

FIGURE 3 illustrated yet another embodiment of the device employing nut 27 of FIGURES 2 and 2A, but this time having a sleeve 30 which includes a rearward, rounded or tapered end 31. Chamfered end 31 in fact serves as somewhat of a flow guide for the reinforced elastomeric sleeve 30 and, in addition, aids in the pulling of the juncture of the rounded end 31 (see juncture J) within the main cylindrical body 32 of sleeve 30 into the concavity 28 of nut 27. This preserves the retention enlargement of the sleeve upon compression loading of the device rearwardly of surface 23; but still further, such a configurement insuring a pulling or "sucking into," in effect, of the rounded end 31 and junction J within concavity of nut 27. This action insures a minimum amount of distortion, fixed or otherwise, of the rearward portion of reinforced elastomeric sleeve 19 in the nut area. Hence, the only possibility of fracturing the sleeve 19 is at point X, i.e. the anus of aperture 11. Where a reinforced elastomeric sleeve is used, as herein taught, experimentation has indicated that there is substantially no danger whatever of fracturing at this region regardless of the degree of compression loading attached to the device. Further, if such were ever a problem, the point or area X could be rounded slightly as shown at X' in FIGURE 3A so as to provide for an assured compression securement which is totally free from forces tending to fracture sleeve 19.

FIGURE 3A indicated the use of the structure at FIGURE 3 wherein compression loading of the device is applied. To be noted again is the direction C in which the web of the material is simply compressed, without radial or diametric change relative to the cross section of the web. A flow of material exterior of the web provides for the retention, and the nut is relieved as heretofore described in the presence of cavity or recess 28, to provide for flow of the sleeve within the interior of the web.

Experimentation has indicated that the various embodiments of the present invention as above outlined, and particularly the above item as shown in FIGURES 2 and 2A, 3 and 3A, are substantially indestructible under every conceivable use of essentially normal portions. Additionally, the devices are continuously reusable and, with the web reinforcement, preserved the feature of an extremely tight retention of the device to the base structure to which it is applied.

FIGURE 3B indicates that the nut means employed in FIGURES 2–3 may in fact comprise a two-part item, having conventional nut 35 backing interiorly tapered sleeve providing concavity 28.

While particular embodiments of the present invention have been shown and described, it will be obvious to those skilled in the art that changes and modifications may be made without departing from this invention in its broader aspects, and, therefore, the aim is to cover all such changes and modifications as fall within the true spirit and scope of this invention.

I claim:
1. In combination, a base structure having a thorough aperture; an attachment member having a thorough aperture; a bolt having a head as a reaction member disposed proximate one side of said attachment member and a shank integral with said head and passing through said attachment member aperture and through said base structure aperture, through and beyond said base structure; a resilient, elastomeric, elongate, uniformly cylindrical sleeve disposed over said shank within said base structure aperture and protruding beyond said base structure; and nut means operably disposed onto said shank, backing said sleeve as a reaction means, and having a sleeve reaction surface cooperably disposed with respect to said sleeve, said sleeve having a sole axially aligned, cylindrical, centrally embedded textile web coterminous with the longitudinal dimension of said sleeve, and wherein the outside diameter of said nut is not greater than that of said sleeve, wherein said nut means is provided with an interior concavity at its reaction surface relative to said sleeve, said concavity including a generally annular wall converging toward the nut axis and wherein said sleeve is chamfered in correspondence with said concavity at that end which is proximate said nut means, said nut means being constructed to receive at said interior concavity material flow of said sleeve upon compression loading thereof.

2. In the combination of bolt means having a head, nut means operatively disposed upon said bolt means and having a sleeve reaction surface, and an elongate, elastomeric, uniformly cylindrical sleeve means circumferentially disposed over said bolt means between said head and said nut means, and improvement wherein said sleeve comprises a resilient elastomeric sleeve body and an axially aligned, sole tubular textile web cylindrically embedded centrally therewithin and coterminous with the length thereof, wherein said nut means has a diameter which is not greater than that of said sleeve and said reaction surface is defined by an interior concavity means which includes a generally annular wall converging toward the nut axis for receiving material flow of that portion of said elastomeric sleeve body which is circumscribed by said tubular web, said sleeve means having a chamfered, rear, circumferential edge which is chamfered in dimension in correspondence with said concavity for pressure-fitting into said concavity of said nut means.

References Cited

UNITED STATES PATENTS

| 2,277,885 | 3/1942 | Rodanet | 85—70 |
| 2,075,714 | 3/1937 | Hamill | 85—70 |
| 2,257,538 | 9/1941 | Schlueter | 85—70 |
| 2,605,588 | 8/1952 | Lindstaedt | 85—70 |
| 2,691,543 | 10/1954 | Morand | 85—70 |
| 3,017,800 | 1/1962 | Cohen | 85—70 |

FOREIGN PATENTS

| 690 | 2/1968 | Great Britain. |
| | | (Addition to No. 1,868) |
| 990,103 | 5/1951 | France. |
| 917,999 | 9/1954 | Germany. |

EDWARD C. ALLEN, Primary Examiner